United States Patent [19]

Batten

[11] Patent Number: 4,875,266
[45] Date of Patent: Oct. 24, 1989

[54] RELEASABLE HIGH TORQUE FASTENER

[76] Inventor: Ronald W. Batten, 5618 White Ct., Torrance, Calif. 90503

[21] Appl. No.: 72,438

[22] Filed: Jul. 13, 1987

Related U.S. Application Data

[63] Continuation-in-part of Ser. No. 802,425, Nov. 27, 1985, Pat. No. 4,737,059.

[51] Int. Cl.$^4$ .............................................. B23P 19/04
[52] U.S. Cl. ...................................... 29/263; 411/267; 411/433; 285/387
[58] Field of Search ................... 29/244, 256, 263, 268; 411/266, 267, 432, 433; 285/23, 387

[56] References Cited

U.S. PATENT DOCUMENTS

| | | | |
|---|---|---|---|
| 2,133,697 | 10/1938 | Hansen | 29/263 |
| 2,588,372 | 3/1952 | Erb | 411/432 |
| 3,200,484 | 8/1965 | Garman | 29/263 |
| 3,305,921 | 2/1967 | Morse | 29/263 |
| 3,858,298 | 1/1975 | Whitledge et al. | 29/263 |
| 4,659,273 | 4/1987 | Dudley | 411/433 |
| 4,715,756 | 12/1987 | Danico et al. | 411/432 |

*Primary Examiner*—Judy Hartman
*Attorney, Agent, or Firm*—Plante, Strauss, Vanderburgh

[57] ABSTRACT

There is disclosed an easily releasable fastener which is specifically designed for high torque applications. The fastener comprises a slotted nut having at least two axial slots, and preferably no more than one of the slots extends completely through the body of the fastener. The slots divide the fastener into at least two segments which, in the preferred embodiment are retained together by the residual portions of the incomplete slots. Each of the segments has a flat surface for torque transmission and the assembly of segments is surrounded by a thin retainer band seated in an annular groove about the body of the fastener. The fastener is mounted within a retaining ring which has internal flats that coact with the flatted surfaces of the individual segments. The retaining ring has external wrenching flats to permit the application of the fastener to a standard bolt. The fastener is released by an extractor which has a cylindrical shroud to surround the retainer ring, with an annular lip at one end and a drive bolt at its opposite end. The annular lip of the shroud is placed beneath the annular edge of the retaining sleeve and the drive bolt is advanced against the upper surface of the segmented nut, thereby forcefully extracting the ring from the segmented nut and releasing the hoop tension about the nut, whereby the nut segments are spread outwardly, releasing the bolt tension.

12 Claims, 7 Drawing Sheets

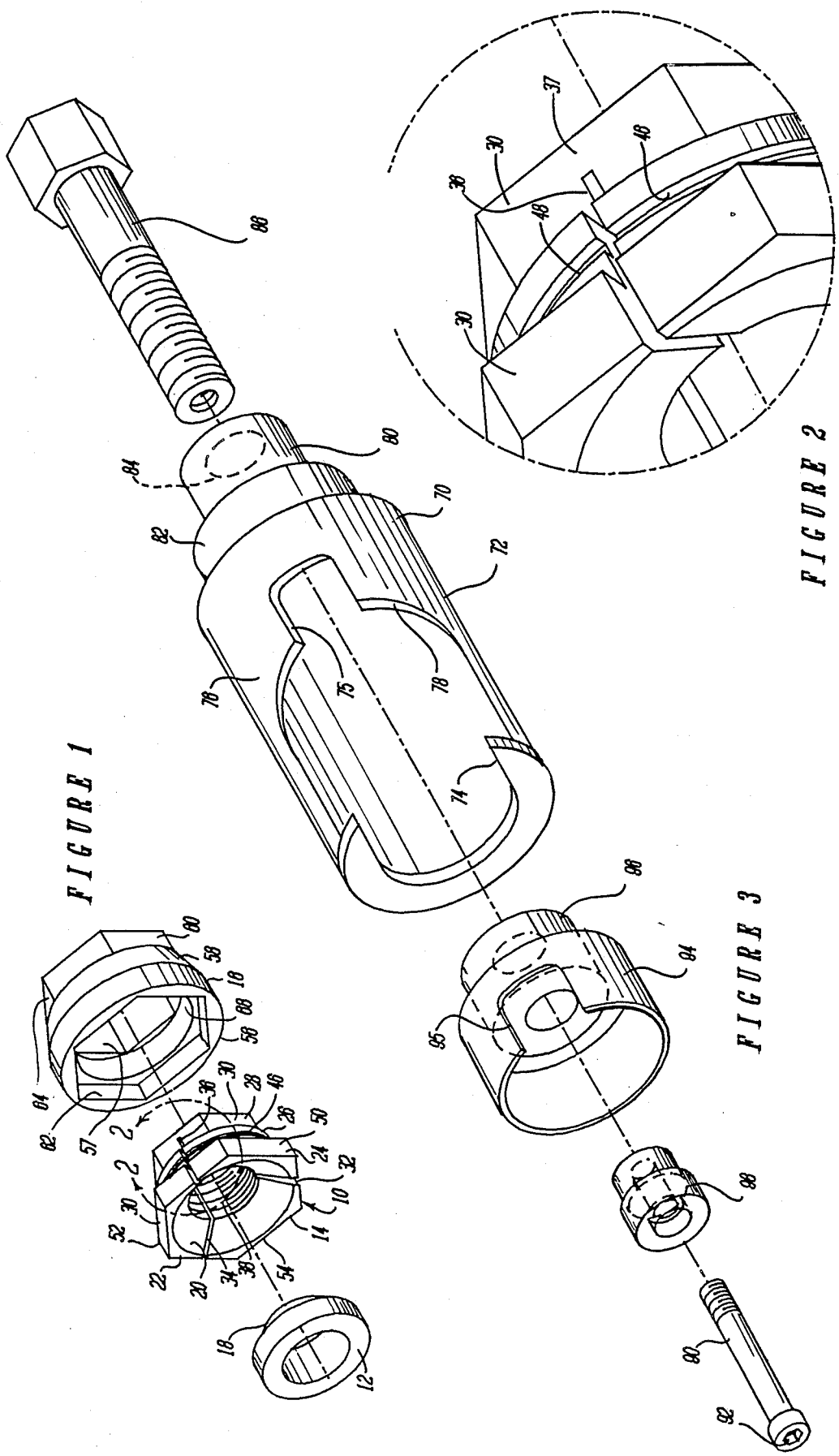

RELEASABLE HIGH TORQUE FASTENER

This application is a continuation-in-part of parent application Ser. No. 802,425, filed Nov. 27, 1985, now U.S. Pat. No. 4,737,059.

BACKGROUND OF THE INVENTION

1. Field of he Invention

This invention relates to a releasable fastener and, in particular, to a slotted fastener suitab le for high torque fastening applications.

2. Brief Statement of the Prior Art

Releasable fasteners, typically separation nuts, have been used in various aerospace applications, often with explosive squibs or with fluid pressure, for remote release. These devices have universally used an axially movable retainer which surrounds an assembly of a segmented nut fastener. Many complex designs have been developed with annular cavities in the retainer ring, such as in U.S. Pat. No. 3,334,536 and cams or levers have been provided to impart a positive separation force to the segments as the retainer sleeve is displaced, e.g., see U.S. Pat. No. 3,120,149. The latter patent also discloses a hexagonal interface between the segmented nut and the retainer sleeve to transmit torque. This patent, however, uses two nut segments which precisely mate, however, uses two nut segments which precisely mate, without any axial separation slot. The nut segments of this patent would be quite costly to manufacture, as each nut segment must be separately machined.

U.S. Pat. No. 3,813,984 discloses that a practical and cost effective method of manufacturing a segmented nut fasatener is by axially slitting a preformed nut fastener. This, however, creates axial separation slots between the segments. In U.S. Pat. No. 3,170,363 the axial slots arae filled with plastic fins which provide thread locks. Plastic finds, however, cannot transmit any significant torque, and axial keys are provided between each of the nut segments and the retainer sleeve to transmit the fastening torque. This, the most economical method of manufacture of slitting nuts, has heretofore precluded a simple design for transmission of fastening torque, and most designs have used complex keys and mating keyways between the nut segments and the outer, retainer sleeve.

BRIEF DESCRIPTION OF THE INVENTION

This invention is an easily releasable fastener which is specifically designed for high torque applications. The fastener comprises a slotted nut having at least two axial slots. Preferably no omre than one of the slots extends completely through the body of the fastener. The slots divide the fastener into a least two segments which, in the preferred embodiment are retained together by the residual portions of the incomplete slots. Preferably three slots are provided, dividing the fastener into three segments. Each of the segments has a flat surface for torque transmission and the assembly of segments can be surrounded by a thin band of metal or of an elastomeric material, preferably an O-ring which can be seated in an annular groove about the body of the fastener. This band functions to retain the assembly of segments, after the slots have broken entirely through the body of the fastener. The fastener is mounted within a retaining ring which has internal flats that coact with the flatted surfaces of the individual segments. The retaining ring has external wrenching flats to permit the application of the fasatener to a standard bolt. The undersurface of the fastener has a beveled surface and the fastener is employed with a washer having a mating beveled surface which, under the fastener tension urges the segments outwardly, against the retainer ring.

The fastener is released by an extractor which comprises a cylindrical shroud having an annular lip at one end and a drive bolt at its opposite end. The annular lip of the shroud is place beneath the annular edge of the retaining sleeve and the drive bolt is advanced against the upper surface of the segmented nut, thereby forcefully extracting the ring from the segmented nut and releasing the hoop tension about the nut, whereby the nut segments are spread outwardly, releasing the bolt tension.

BRIEF DESCRIPTION OF THE DRAWINGS

The invention will be described with reference to the FIGURES of which:

FIG. 1 is an exploded perspective view of the fastener system of the invention;

FIG. 2 is an enlarged view of the area within line 2—2' of FIG. 1;

FIG. 3 is an exploded perspective view of the extractor of the invention;

DESCRIPTION OF PREFERRED EMBODIMENT

Figure 4:
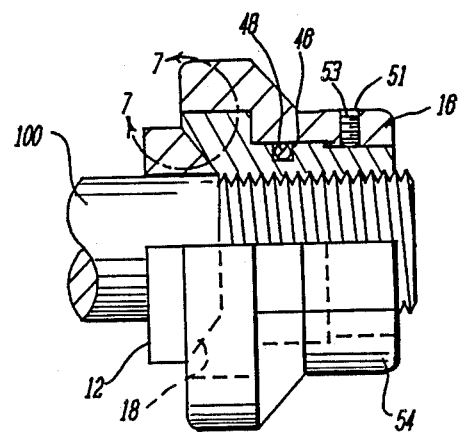
FIG. 4 is an elevaational cross sectional view of the fastener on a bolt.

Referring to FIG. 1, the fastener 10 of the invention is an assembly of three major components which are a washer 12, the fasatener or nut 14 and a retaining ring 16. The washer 12 has a beveled upper retaining rign 16. The wsher 12 has a beveled upper face 18 which has a mating bevel to the bevel 20 on the undersurface 22 of the fastener 10. The fastener 10 has a base 24 with an intermediate cylindrical section 26 and an upper neck 28. Preferably, the base 24 and neck 28 have a plurality of external flats 30 which are, most preferably, hexagonal flats. The fastener has a plurality of axial slots, one of which is a through slot 32 and preferably, the other two are partial slots 34 and 36 which extend substantially but not entirely through the body of fastener 10, leaving a short uncut portion 37 (see FIG. 2).

The fastener 10 has a beveled counter bore 20 on its undersurface 22 which has an angle of inclination of from 20° to 45°, preferably 30°. The cylindrical section 26 preferably has aan annular groove 46 (see FIG. 2) which receives a retainer band which is aa metal or elastomeric band.

The assembly of nut segments 50, 52 and 54 which are formed by the plurality of axial slots 32, 34 and 36 is sreceived within the retainer ring 16. The retainer ring 16 has a cylindrical base 56, an intermediate frustoconical section 58 and an upper neck 60, which has a plurality of flats 64, preferably hexagonal flats. The internal surfaces of the retainer ring 16 match the external surfaces of the fastener 10 and, for this purpose, the base 56 has an internally hexagonally flatted surface 62. Preferably, the external surface of base 56 is cylindricl. The intermediate, frustoconical section 66 has an internal cylindrical wall 68 having an internal diameter which is sufficient to receive the cylindrical section 26 of the fastener 10. The upper neck 60 of the retaining ring 10 has an internal, hexagonally flatted surface 57 which mates with the external flats 30 on the upper neck 28 of the nut 10. The nut 10 is shown as being subdivided into three segments by the axial slots.

After a first application and release, the nut fractures through the uncut portions such as 37 of slots 34 and 36, and is converted into an assembly of three independent segments 50, 52 and 54. These segments are thereafter retained in the assembly by the retaining band 48.

The nut fastener 10 of the invention can be applied with high torque applications which are transmitted through the retaining ring directly to each of the segments of the nut, as each of these segments have separate and individual flats for transmission of torque. This greatly facilitates the manufacture of the fastener as the fastener can be formed in an unslotted condition and thereafter can be slotted by cutting or milling the axial slots in its body. Although the milling operation removes the metal and leaves a substantial gap in the fastener, this gap does not affect transmission of torque nor cause distortion or misalignment of the segments even while high torque loads are transmitted because each of the segments has its own or individual torque transmission flats.

Referring now to FIG. 3, there is illustrated the extractor 70 which is used to release the fastener 10. As illustrated, the extractor 70 comprises a cylindrical shroud 72 which has a reduced diameter, internal annular lip 74 at one end. At least one side 76, of the shroud 72 has a wide slot 78, sufficiently wide to permit application of the shroud over the base 56 of the retaining ring. Preferably the slot78 has a central slot extension 75, which provides clearance for end extensions of bolts. The opposite end of the shroud is closed, with first and second coaxial cylindrical bosses 80 and 82 which have an axial through bore 84 which is internally threaded to receive the lead screw 86 which is a standard machine bolt. The end of lead screw 86 has an internally threaded longitudinal bore 88 which receives fastener bolt 90 having an internally hexagonally broached slot 92 for receiving an Allen wrench. The shroud 72 internally receives a sleeve 94 which is mounted on a suitable roller bearing race 96 that is received within a central bore in boss 80. The sleeve 94 also has a central slot 95 along one side to receive extensions of bolts.

The extractor is retained by fastener bolt 90 which extends through cylindrical plug 98 that is seated in the end of the roller bearing race 96.

Referring now to FIG. 4, there is illustrated an elevational section view of the fastener 10 on a standard machine bolt 100. The machine bolt 100 has a threaded end which receives the internally threaded fastener segments 50, 52 and 54 which are entirely received withiin the retaining ring 16. The fastener 10 seats against the beveled upper surface 18 of the washer 12 and is retained in a loop stress bearing relationship to the retaining ring 16. The cylindrical intermediate section of the segmented fastener 10 has an annular groove 46 which receives the retaining band 48. In some applications, particularly applications subject to frequent and intensive vibrations, lock means are provided to prevent unintentional release of the retainer 16. For this purpose the retainer can have one or several thredded bores 51 each of which receives a set screw 53.

Figure 5:
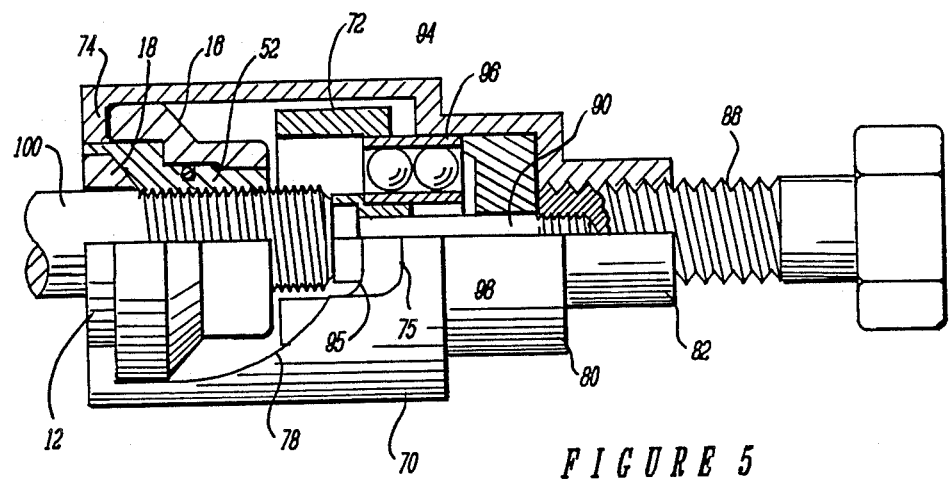
FIG. 5 is an elevational sectional view of the extractor applied over a fastener of the invention.

Referring now to FIG. 5, the fastener assembly of the invention is illustrated in its application for extraction. The extractor 70 is mounted over the retaining ring 16 with its annular lip 74 received beneath the undersurface of the retaining ring 16. The lead screw 86 is turned to advance the sleeve 94 and plug 98 over the segmented nut 14 with the plug 98 distally bearing against the end of the bolt 100. The slot 95 of sleeve 94 is aligned with the slot extension 75 of shroud 72, to permit placement in applications where the end of the bolt 100 projects beyond the nut fastener 10.

In this application, as lead screw 86 is advanced in the shroud 72, a lifting force is exerted on the retainer ring 16, causing the retainer ring 16 to slide axially from the segmented nut 14. As the segmented nut 14 is under compressive loading by bolt 100, the inclined surface 18 of the washer 12 exerts a radial force on the nut segments 50, 52 and 54, urging them outwardly in a radial direction as the retaining ring clears the base of the nut segments. As the retaining ring slides axially, it enters sleeve 94. At this point, the nut segments 50, 52 and 54 are spread outwardly, but are prevented from separating or parting entirely by the sleeve 94 which encloses the upper end of the retaining ring and prevents it from entirely clearing the nut. This is an important safety feature as it precludes any possibility that the nut segments could sever and fly apart from the bolt.

Figure 6:
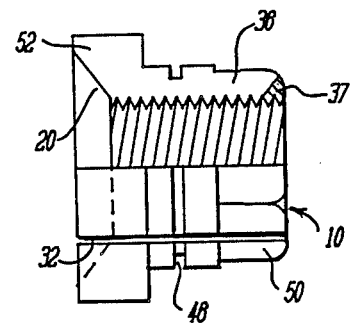
FIG. 6 is a sectional view along one of the slots of the fastener.

As previously mentioned, the nut fastener 10 has one through slot 32, and two incomplete slots 34 and 36. FIG. 6 illustrates a view along slot 36 and shows the unslotted portion 37 which constitutes a web between fastener segments 50 and 52. In many applications, the unslotted portion 37 serves as a pivot point for the individual segments, permitting them to swing outwardly and open, without completely breaking apart. With repeated applications and removals, however, the unslotted portion will eventually fracture, and the band 48 is thus provided to retain the segments when the retainer 16 is released.

Figure 7:
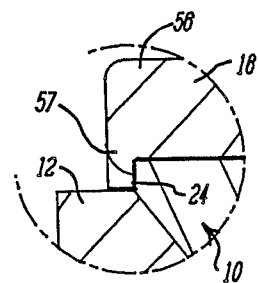
FIG. 7 is an enlarged view of the area within line 7-7' of FIG. 4, illustrating an alternaative embodiment.

FIG. 7 illustrates an alternative retainer lock means which can be used with applications subjected to vibrations which could tend to loosen the retainer 16. In this embodiment, the basae 56 of the retainer 16 extends a slight distance beyond the basae 24 of the nut fastener 10, and is rolled over the outer edge of the base 24 to stake the retainer 16 in the assembly. When the extractor is applied, sufficient force can be applied to open lip 57 and release the retainer.

The invention provides a very direct and readily releasable fasatener which can be applied on very high torque applications, such as use with chemical process equipment, pressure vessels, and the like. The fasteners of the invention can be readily fabricated by slotting with consequental removal of metal without requiring the use of any supplemental spacers that would be necessary to prohibit their distortion or misalignment during application. This is accomplished as each of othe individual segments has its own wrenching surface for torque trnsmission, thereby avoiding the necessity to transmit torque from one segment to oan adjacent segment. The fastener extractor serves to provide very simple and direct axial disloding force on the retaining ring and also provides a protecive shroud that precludes any danger of injury from flying segments that could otherwise separate and abruptly dislodge from the assembly.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A releasable multiple part fastener which comprises:
   (a) a first part comprising an internally threaded slottede body having:
      (1) a base and at least one reduced diameter neck of a lesser diameter;
      (2) at least one axial slot extending axially through the body of said fastener and at least one additional axial slot extending substantially, but not entirely, through the body of said fastener, subdividing said body into at least two segments and
      (3) at least one, non-circular surfaced, torque transmitting external wall on each of said segments and
   b. a second part comprising a retainer ring surrounding said slotted body and having:
      (1) a first annular bottom recess in open communication with a second annular of reduced diameter recess of reduced diameter to receive said slotted body; and
      (2) a torque transmitting section comprising an internal wall with a non-circular surface of a contour to mate with the non-circular surfaced, torque transmitting external waall of each said fastener segment and in hoop stress bearing relationship thereto.

2. The fastener of claim 1 wherein said basae of said slotted body and said first annular bottom recess of said retaining ring have hexagonally flatted walls.

3. The fastener of claim 1 wherein said reduced diameter neck of said slotted body and second annular recess of said retainer have hexagonally flatted walls.

4. The fastener of claim 3 wherein an upper end of said reduced diameter neck has said hexagonally flatted walls, and including a cylindrical neck portion between said base and said uppe end.

5. The fastener of claim 4 including slotted body segment retainer means received abou said cylindrical neck portion.

6. The fastener of claim 5 including an annular groove extending abou said cylindrical neck portion said slotted body with an elastomeric ring seated therein and serving as said segment retainer means.

7. The fastener of claim 1 wherein face of said basae of said slotted body is bevelled.

8. The fastener of claim 7 in combination with a third part comprising a washer having a first flat face and an opposite outwardly bevelled end face to mate with the bevelled face of said slotted body.

9. The fastener of claim 8 wherein said washer has a cylindrical wall contiguous to the bevelled face, thereby raising said fastener a predetermined distance above a workpice secured with said fastener.

10. The releasable fastener of claim 1 in combination with a retainer retractor comprising:
    a. a sleeve body having:
       (1) an internal, annular lip abou its lower end;
       (2) a closed end face on its opposite end with a single internally threaded central bore; and
       (3) an open side wall; and
    b. an externally threaded drive rod received within said central bore.

11. The retainer retractor of claim 10 wherein said sleeve internally receives a segment guard having a cup shape which is removably attached to said drive rod.

12. The retainer retractor of claim 11 wherein said closed end face includes a central recess to receive said segment guard.

* * * * *

UNITED STATES PATENT AND TRADEMARK OFFICE
CERTIFICATE OF CORRECTION

PATENT NO. : 4,875,266

DATED : October 24, 1989

INVENTOR(S) : Ronald W. Batten

It is certified that error appears in the above-identified patent and that said Letters Patent is hereby corrected as shown below:

Claim 1, lines 23 and 24, after "annular" delete --of reduced diameter --.

Claim 1, line 29, delete "waall" and substitute therefor --wall--.

Claim 2, line 32, delete "basae" and substitute therefor --base--.

Claim 4, line 4, delete "uppe" and substitute therefor --upper--.

Claim 5, line 6; claim 6, line 9; claim 10, line 25, delete "abou" and substitute therefore --about--.

Claim 7, line 12, delete "basae" and substitute therefor --base--.

Claim 7, line 12, after "wherein" insert --an end--.

Signed and Sealed this

Ninth Day of October, 1990

Attest:

HARRY F. MANBECK, JR.

*Attesting Officer*     *Commissioner of Patents and Trademarks*